Jan. 28, 1936. T. C. DEVINE 2,028,740

TRIMMING STRIP

Filed Oct. 6, 1933

INVENTOR.
THOMAS C. DEVINE
BY
ATTORNEY.

Patented Jan. 28, 1936

2,028,740

UNITED STATES PATENT OFFICE 2,028,740

TRIMMING STRIP

Thomas Charles Devine, Bronxville, N. Y.

Application October 6, 1933, Serial No. 692,530

3 Claims. (Cl. 41—34)

My invention relates to tapes technically known as gimp used in trimming furniture, and particularly upholstery and cushions.

Trimming tapes or gimps as commonly made are woven in various widths, designs and of various materials. They are used chiefly to trim the edges of furniture, such as the backs, arms, and seats of chairs, and are secured to the furniture by means of a number or row of tacks or nails, having decorative heads of various shapes and designs according to the style of the furniture. Furniture representing a certain period of one country may require the domes or heads of the tacks and nails to be placed in a row relatively close together; that of another period may require that the domes or heads be arranged in spaced groups of predetermined number, and the style for another period and country may require that the domes or heads be spaced relatively far apart, and so on. Furthermore the designs of the heads vary. Regardless of the grouping or arrangement of the nails or tacks which secure the trimming tape or gimp to the furniture, it is a known fact that a great many nails are driven into the furniture and if this is done several times when reupholstering expensive furniture the wood is greatly damaged and in many cases split.

With the foregoing in mind, the important general object of my present invention is the provision of trimming tapes or gimps having attached thereto decorative domes, buttons or medallions resembling nail or tack heads, so that the unitary tape and domes or buttons may be attached to the furniture, cushion, or other articles without driving relatively large tacks or nails into the wood and yet providing the usual appearance to the finished article.

All of the objects and advantages of the invention will become apparent and will be pointed out during the course of the following detailed description of the accompanying drawing, in which Fig. 1 is a vertical longitudinal sectional view through a fragment of trimming tape with a dome mounted thereon in position to be secured thereto;

Figure 1:
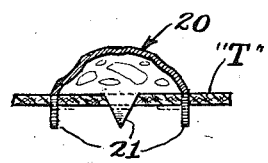
Figure 2:
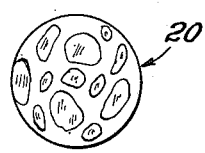
Fig. 2 is a top plan view of the dome shown in Fig. 1.
Figure 3:
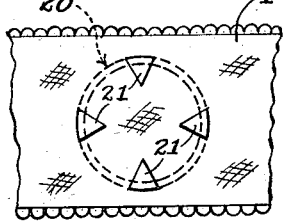
Fig. 3 is a bottom plan view of the trimming tape showing the means attaching the dome of Fig. 1 thereto.
Figure 10:
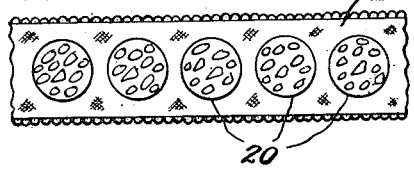
Fig. 10 is a top plan view of a fragment of trimming tape showing a line of decorative domes arranged thereon.
Figure 11:
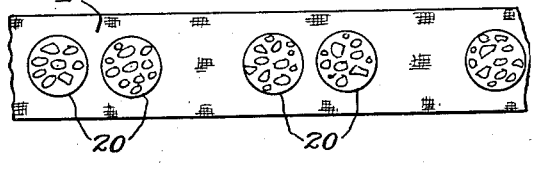
Fig. 11 is a view similar to Fig. 10 showing a different arrangement or grouping of the domes.

Throughout the drawing, the letter "T" designates the trimming tape or gimp. In Figs. 1–3, the numeral 20 designates a dome preferably made of metal and dented to provide a hammered or antique appearance. The margin of the dome is provided with relatively short pointed prongs 21, illustrated as four in number, which pierce the trimming tape or gimp T, as shown in full lines in Fig. 1. Thereafter, that is, when the dome is properly positioned on the tape and the prongs have pierced the same, they are bent over to the dotted line position of Fig. 1 and the full line position of Fig. 3 to firmly secure the domes on the tape. They may be arranged in a continuous evenly spaced line as shown in Fig. 10 or in groups of two, or any other number, as shown in Fig. 11 with spaces between the groups. The positioning, grouping, or arrangement of the domes on the tape and the style or character of the domes would of course be in accordance with the style or period of the furniture or article to which the tape is to be applied.

Figure 4:
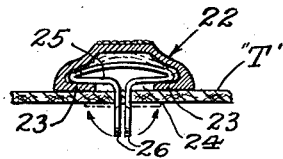
Fig. 4 is a view similar to Fig. 1 of another type of dome and means for attaching the same to the tape.
Figure 5:
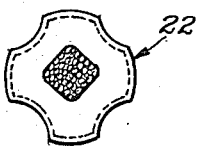
Figs. 5 and 6 are views similar to Figs. 2 and 3 respectively.
Figure 8:
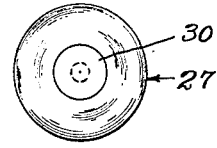
Figs. 8 and 9 are views similar to Figs. 2 and 3 respectively.
Figure 6:
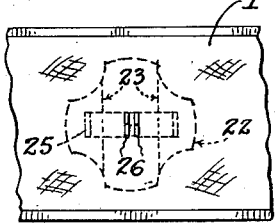

In Figs. 4–6, the dome 22 is provided with an inwardly directed horizontally disposed flange 23, and an opening 24 defined by the edge of the flange 23. The interior of the dome 22 is hollow and receives the head 25 of the fastening element having two prongs 26 which pierce the tape T. The head 25 is preferably resilient and its ends are compressed or held between the flange 23 and the side walls of the dome. Fig. 5 shows the appearance of the face of the dome 22, which, of course, is not essential to the invention, and Fig. 6 shows the prongs 26 clamped or bent down against the tape T to hold the dome to the tape.

Figure 7:
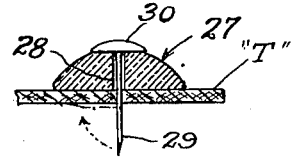
Fig. 7 is a view similar to Figs. 1 and 4 showing a further modification in the dome and manner of attaching it to the tape.
Figure 9:
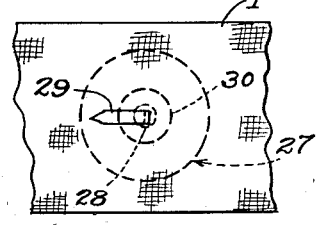

In Fig. 7, the decorative dome is shown in the nature of a button 27, for example of glass, having curved side walls and a central orifice 28. The bottom of the button rests against the top of the trimming tape T and the prong 29 of the fastening element having a head 30 covering the top of the orifice 28 and resting on the top of the button 27 extends through the orifice and pierces the trimming tape so that it can be bent to the dotted line position of Fig. 7 and full line position of Fig. 9 to hold the button on the trimming tape. Of course, the arrangement or grouping of the elements shown in Figs. 4 and 7 on the tape may be the same as explained in connection with Figs. 1, 10, and 11.

Figure 12:
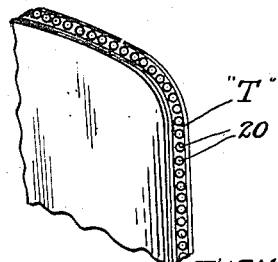
Fig. 12 is a fragmentary perspective view of the back of a chair showing a strip of trimming tape embodying the invention applied thereto.

A unitary gimp tape and decorative members such as shown in Fig. 10 is illustrated applied to the edge of a chair back in Fig. 12, the tape being held in place by relatively small gimp tacks (not shown) inserted through the tape at desired points and driven into the wood, it not being necessary to use a great number of these small tacks, and the shanks of the tacks of course being much smaller than the usual shanks of the tacks which carry dome heads, the wood is not damaged. Furthermore, when reupholstering a chair, the gimp tacks can be driven in at different points, whereas in the usual manner of applying the gimp by the domed tacks or nails, the wood receives the tacks or nails in substantially the same line but not in the same openings which results in damaging and splitting the wood.

Figure 13:
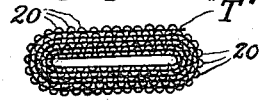
Fig. 13 is a side elevation of a roll of trimming tape embodying the invention.

Another advantage of the invention is that the prongs which secure the domes onto the tape are bent down against and flush with the tape, the underside thereof is substantially smooth so that the gimp made in accordance with my invention not only flushly engages against the surface to which attached, but may also be rolled into compact form for packaging as shown in Fig. 13.

Figure 14:
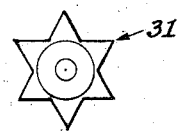
Fig. 14 is a plan view of a modification in the shape of the decorative button.

I do not deem a detailed description of the medallion 31 or device shown in Fig. 14 necessary, except to state that it illustrates another shape and may be applied in the manner shown in connection with Fig. 1 by prongs depending from the edges of the star.

Figure 15:
Fig. 15 is a perspective view of still another modification.
Figure 16:
Fig. 16 is a view similar to Fig. 1 showing the medallion of Fig. 15 applied to the tape.

In Fig. 15 the medallion 32 is substantially flat and has a pair of prongs 33 depending adjacent its center, the same being formed by cutting along the lines 34 and bending the prongs down leaving an opening 35 through which the tape is visible. The medallion 32 is applied as shown in Fig. 16 by placing the same on the tape with the prongs 33 piercing the tape and then bending them over to flushly engage against the tape.

The decorative members are preferably of less width than the width of the strip, and when secured thereto, whether placed closely together or spaced relatively far apart, or arranged in spaced groups, there are areas on the strip through which the gimp tacks may be driven. Of course, the strip with the decorative members secured thereto may be sewed or otherwise secured to the furniture or other article.

Aside from the advantages of the invention already referred to, I wish to point out that inasmuch as the decorative members resembling nail or tack heads are not subjected to hammering, it is possible to make them much lighter and cheaper. Furthermore, the attaching of the gimp or tape with the decorative members assembled thereon in accordance with my invention is accomplished much more quickly, and without injury to the word or furniture as is the case of gimp attached by nails or tacks having the decorative heads and shanks of considerable size which must be driven into the wood. Finally if gimp embodying my invention is removed from the furniture, and a new one replaced time and again, there is plenty of good solid wood in which to drive the gimp tacks if such are used.

I claim:

1. As a new article of manufacture, a gimp for trimming furniture or other articles comprising an elongated strip of narrow flexible material, a plurality of decorative members simulating the decorative heads of upholstery tacks or nails arranged in a row on one side of the strip at predetermined intervals, and means permanently securing said members to the strip, the other side of the strip being substantially smooth to flushly engage against the surface to which the strip is to be applied, whereby said strip may be applied to furniture by relatively few and inconspicuous tacks or the like to present the same appearance as gimp attached by the usual tacks or nails having decorative heads.

2. As a new article of manufacture, a gimp for trimming furniture or other articles comprising an elongated narrow strip of flexible material, a plurality of decorative members simulating the decorative heads of upholstery tacks or nails arranged in a row on one side of the strip at predetermined intervals, and means permanently securing said members to the strip, whereby said strip with the decorative members thereon may be applied to furniture by relatively few and inconspicuous tacks or the like to prevent the same appearance as gimp attached by the usual tacks or nails having decorative heads.

3. A gimp strip or trimming tape for furniture comprising an elongated fabric strip, a plurality of members simulating the decorative heads of upholstery tacks or nails arranged on one side of the strip, prongs carried by the dome-shaped member and piercing the strip, said prongs being bent up against the other side of the strip to hold the dome-shaped members thereon and to lie substantially flush against said other side of the strip, whereby the same may be flushly placed against the surface of the article to which the strip is to be attached, the dome-shaped members being spaced apart sufficiently to provide areas on the strip to receive small and substantially inconspicuous tacks or nails for securing the strip to the furniture.

THOMAS CHARLES DEVINE.